Patented May 23, 1950

2,508,430

UNITED STATES PATENT OFFICE 2,508,430

BITUMEN-TREATING AGENT

Vaughn R. Smith, Berkeley, Don E. Stevens, Fairfax, and Edward W. Mertens, Berkeley, Calif., assignors to California Research Corporation, San Francisco, Calif., a corporation of Delaware No Drawing. Application February 17, 1949,
Serial No. 77,064

16 Claims. (Cl. 106—273)

This invention relates to the preparation of compositions useful in the art of road-making, and is concerned more particularly with improving the bond between aggregate and bituminous materials. More specifically, the invention pertains to the preparation of bituminous compositions containing a monoamine salt of an organo-substituted inorganic acid, whereby the bond between a bituminous substance and a wet or dry aggregate may be made stronger, firmer and more resistant to conditions tending to destroy said bond.

When employing a bituminous substance as a protective or binding material, a constant object sought in the art is the improvement of the adhesive bond between the bitumen and the material, such as aggregate, to be protected therewith or bound thereto. It is desirable to accomplish this object regardless of the type or nature of the material employed or the conditions to which the treated material may be subjected.

Claims directed to monoamine salts of organo-substituted acids of phosphorus specifically are covered in our co-pending application Serial No. 77,065, filed February 17, 1949.

For example, in the construction of roadways, it is customary to apply bituminous paving materials to a suitable aggregate, reasonably available near the site of construction. Portions or all of 'his aggregate may be of a hydrophilic nature; that is, it is wetted by water in preference to oil. Before the ordinary bituminous paving material is applied to this type of aggregate, it is customary to dispel all of the moisture from the aggregate, otherwise a less satisfactory mix is obtained. However, even when the aggregate is dried and a good initial bond is obtained, the unavoidable contact of the bitumen-aggregate composition with normal surface water, rain water and moisture present in the subgrade gradually brings about a breakdown of the aggregate-bituminous material bond. The aggregate is gradually wetted by the water, and the bituminous substance no longer holds the aggregate together, as a result of which a breakdown of the roadway occurs.

A number of substances, known as anti-stripping agents, have been proposed for the purpose of strengthening the bond between hydrophilic aggregate and bituminous substances. These agents are incorporated into the bituminous substance and/or the aggregate. However, many of these substances are relatively expensive for use in the large quantities required in new roadway construction or in roadway repair work. Other substances which are more readily available for this purpose and are relatively inexpensive are nevertheless unsatisfactory for long-term use due either to decomposition of the anti-stripping agent itself or a tendency for the anti-stripping agent to promote emulsification of water into the surface.

It is an object of this invention to provide a means of forming a lasting bond between bituminous substances and mineral aggregate.

It is a further object of this invention to provide bituminous compositions capable of adhering firmly to moist mineral aggregate.

It is still a further object of this invention to provide bituminous compositions which will continue to adhere firmly to mineral aggregate.

It is another object of this invention to provide a means of treating mineral aggregate so that a lasting bond may be obtained between bituminous substances and the treated mineral aggregate.

It is also an object of this invention to provide a relatively inexpensive means for providing a lasting bond between bituminous substances and mineral aggregate.

Further and other pertinent objects of this invention will be apparent from the following description of the invention.

We have found that the foregoing objects of the invention may be achieved by bringing together mineral aggregate and a bituminous substance in the presence of a monoamine salt of an organo-substituted inorganic acid. Aggregate and/or bituminous substances treated with a monoamine salt of an organo-substituted inorganic acid have been found capable of forming paving mixtures of aggregate and a bituminous substance characterized by a strong adhesive bond between bituminous substance and aggregate. We have further found that this bond may be obtained with a wide variety of wet or dry aggregate, and that paving mixtures formed in accordance with our invention exhibit superior anti-stripping qualities.

The monoamine salts contemplated by the present invention are such as are formed by the reaction of an organo-substituted inorganic acid, hereinafter to be more fully described, and a relatively cationic surface inactive monoamine.

In general, the monoamines of the present invention are essentially water-soluble and surface inactive. Moreover, the monoamines comprehended by the invention are characterized by carbon chains or alkyl groups, any one of which contains fewer than about 12 carbon atoms, although the total number of carbon atoms in all the substituent alkyl groups may be greater than 12. For example, a tertiary amine of the type formula

may contain a total of more than 12 carbon atoms, but $R_1$, $R_2$ or $R_3$, representing alkyl groups, individually contain fewer than 12 carbon atoms, that is, a carbon content below the minimum ordinarily considered necessary in such groups in order to impart surface activity to the molecule.

Defined in another way, the substantially surface inactive monoamines contemplated by the invention are incapable of lowering the interfacial tension of two dissimilar liquids to a degree required to bring such monoamines within the classification of surface active materials. Ordinarily a surface active material (in concentrations of 0.1 per cent, based on the water) is capable of effecting a lowering of interfacial tension of kerosene and water to 10 dynes/cm. and less as measured by a Du Noüy tensiometer, as is well known in the art. Materials, such as the hereindefined monoamines, incapable of effecting such a decrease in interfacial tension, are ordinarily not considered in the art to be surface active substances.

We have further found that a suitable monoamine in carrying out the invention is one in which the bond between the nitrogen of the amino group and the carbon-containing radical is an acyclic carbon-to-nitrogen bond. In other words, by the term "acyclic carbon-to-nitrogen bond," it is meant to include monoamine compounds in which the amino group is bound to carbon by acyclic bonds only, and the amino group does not appear in a heterocyclic ring as shown, for example, by pyridine or piperidine. Preferably employed are the aliphatic monoamines.

The invention contemplates primary, secondary, and tertiary amines; saturated and unsaturated amines. Substituted monoamines, such as alkylolamines are also suitable. Other suitable monoamines are halogenated, alkyl, aralkyl, aryl, arylalkyl and alkoxy amines.

Specific examples of suitable monoamines are methyl amine, ethyl amine, diethyl amine, triethyl amine, isopropyl amine, methyl ethyl amine, tertiary butyl amine, amyl amine, vinyl amine, ethanolamine, diethanolamine, triethanolamine, methyl ethanolamine, beta chloro ethyl amine, beta hydroxy propylamine, aniline, tri-tertiary butyl amine, hexyl amine, etc.

We are aware that lipophilic surface active amines have heretofore been proposed as bitumen treating agents, as shown, for example, in U. S. Patent 2,370,386, and as shown by the use of certain fatty amines. The effectiveness of such materials has been thought due to the presence of a lipophilic group capable of solubilizing in the oil, and a polar amino group capable of reacting with or being adsorbed unto the surface of the aggregate, thus providing a bridge between the dissimilar oil and aggregate surfaces. For this reason, the amine selected in the art has been a surface active lipophilic material. In accordance with our invention, it has been found that readily available and inexpensive substantially surface inactive monoamines may be employed with a non-amidizing organo-substituted inorganic acid to produce, contrary to expectations, a stable and highly polar material of superior effectiveness.

The organo-substituted inorganic acids contemplated by the invention are acid-reacting materials capable of forming a salt with the monoamines. These materials include acid-reacting organo-substituted inorganic acids, such as the acids of a weak acid-forming element, for example, boron or silicon, and organo-substituted inorganic acids of strong acid-forming elements, for example, phosphorus and sulfur. More preferably employed, however, are the organo-substituted inorganic acids of the strong acid-forming elements, such as sulfur, phosphorus and nitrogen.

In addition, the organo-substituted inorganic acids are such as contain at least two carbon atoms, and at least one ionizable hydrogen capable of reacting with the monoamines to form the salt. In general, these materials include compounds characterized by a direct carbon-to-acid-forming element bond, for example, a sulfonic acid; and compounds having the carbon and acid-forming element linked to an intermediate atom such as oxygen, for example, the monoesters of sulfuric acid.

As examples of general types of suitable inorganic acids containing an organic substituent may be mentioned acids of trivalent and pentavalent phosphorus; acids of tetravalent and hexavalent sulfur; acids of boron; carbonic acids; silicic acids, and acids of arsenic.

More specific types of the organo-substituted inorganic acids are the monoesters of sulfuric acid, the mono- and diesters of phosphorous, the mono- and diesters of phosphoric, orthoboric, arsonic, arsenious, arsenic, and orthocarbonic acids; phosphonous, phosphonic, sulfonic, sulfinous, sulfinic, boronic, arsinic, arsonic, stibonic and arsinous acids; such esters of the latter materials as do not deprive the compound of its acid-reacting nature or its ability to form salts with the monoamines, for example, the monoester of phosphonic acid. The sulfur derivatives of the foregoing materials to yield thio compounds are not precluded, for example, mono- and dithio-esters of phosphoric acid.

The organic substituent of the inorganic acid may be alkyl groups, saturated, unsaturated or substituted; alkaryl, aryl, arylalkyl, cyclic non-benzenoid radicals; and oxygen-containing radicals such as those in which the hydrogen of a hydroxyl group has been replaced by esterification, etherification, etc. The nature of these organic radicals is such that the salt of the monoamine and organo-substituted acid is soluble in the bituminous substance or, in the absence of the formation of a true solution, may be stably dispersed in the bituminous material.

Specific examples of organo-substituted inorganic acids which may be employed in accordance with the invention are: Monolauryl sulfuric acid, palmito glyceryl sulfuric acid, wood turpentine sulfuric acid, monoethyl phosphoric acid, mono-lauryl phosphoric; mono- and di-dodecyl, mono- and dicetylphenyl, mono- and tetradecyl, mono- and dioctadecyl, mono- and ditetradecylphenyl, mono- and dioctadecyl-phenyl esters of phosphorous and phosphoric acids; mono dodecyl, mononaphthenyl, mono-amylphenyl, mono-tetradecylphenyl boric, xanthic and dithiolcarbonic acids; ethyl, propyl, butyl, amyl, hexyl, octyl, decyl, dodecyl and tetradecyl compounds of phosphonous, phosphonic, arsonic, arsonous, sulfinous, sulfinic acids; dodecane sulfonic, p-toluene sulfonic, octadecane sulfonic, tetradecane sulfonic, dodecyl benzene sulfonic, asphalt sulfonic acids; hexyl, octyl, decyl, tetradecyl and dodecyl compounds of arsonous acid; monodecyl, monododecyl, monocetyl and propylarsonic acid; hexyl, octyl, decyl, tetradecyl, octadecyl esters of phosphonous and phosphonic acids; the reaction product obtained by nitrating a petroleum resin to form R—NO₂, wherein "R" refers to the petroleum resin, and which nitro petroleum resin tautomerizes to form a nitroxy acid

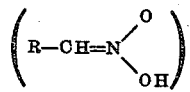

capable of reacting with the monoamine to form the salt.

The selection of the monoamine compounds is governed by the acid material desired to be employed as a reactant in the formation of the salt, such a monoamine being selected as to give in the reaction with the acid a salt containing not fewer than about 12 carbon atoms. We have found that monoamine salts of organo-substituted inorganic acids containing fewer than 12 carbon atoms in the molecule are substantially ineffective as anti-stripping agents. Conversely the selection of the organo-substituted inorganic acid may depend on the monoamine desired to be employed, in which event only such organo-substituted inorganic acids would be employed in the reaction as would yield a monoamine salt product having not fewer than about 12 carbon atoms in the salt molecule. Thus, depending on the acid, monoamines and mixtures thereof having as few as 2 carbon atoms to as many as about 30 carbon atoms in the molecule or more may be employed in carrying out the invention.

Preferably, in the preparation of the salts contemplated by the invention, we have found it advantageous to employ an organo-substituted inorganic acid containing at least six carbon atoms, and preferably, ten to twelve carbon atoms. We have found it particularly advantageous to employ an acid material in which the organic substituent contains at least six carbon atoms and, preferably, ten carbon atoms when the acid is of relatively strong acidity, for example, the dibasic materials, such as phosphonic and phosphonous acids. With the weaker acid materials, that is, those having only one free ionizable hydrogen, for example, the monoester of a phosphonic acid, good results may be obtained with acids having an organic substituent of fewer carbon atoms.

The method of incorporation of the monoamine salt contemplated by the invention in mixtures of aggregate and bituminous substance is not critical. Thus preformed salt of monoamine and organo-substituted inorganic acid may be added to the bituminous substance and/or to the aggregate prior to admixture of the two; or the salt may be formed in situ in either the aggregate or the bituminous substance or both; or the salt-forming elements of monoamine and acid may be added separately or combined in physical mixtures to either or both bituminous substance and aggregate, in which event it is believed that the salt product is formed upon the migration of the salt-forming elements to the interface of aggregate and bituminous substance. By "monoamine salt," therefore, it is intended to include the reaction product of the monoamine and organo-substituted inorganic acid, as well as mere physical mixtures of the two salt-forming elements.

According to a preferred embodiment of the invention, the salt is prepared prior to the incorporation thereof in the bituminous substance. The salt may be obtained by mixing the monoamine and acid, preferably in the presence of a diluent or solvent, at ambient temperatures or at elevated temperatures to expedite admixture and reaction, but below decomposition temperatures of the reactants and of the final salt product. Upon completion of the reaction, the resulting product may be added as such or after removal of part or all of the diluent or solvent or in otherwise purified form, for example, the salt obtained after subjection of the reaction products to purification methods well known in the art, such as distillation or solvent extraction, etc.

In the preparation of the salt, the monoamine and the acidic substance need not be present in stoichiometric proportions, an excess of one or the other being permissible. In general, satisfactory materials have been prepared by employing a mol ratio of monoamine to organo-substituted inorganic acid varying from about 1:3 to about 3:1.

In practicing this invention, the monoamine salt of an organo-substituted inorganic acid may be added to the bituminous substance before the latter is mixed with the aggregate or the aggregate may be separately treated with the monoamine salt. In the event the monoamine salt is mixed first with the bituminous substance, it is sufficient merely to mix the two together with such heating and agitation as may be necessary to produce a homogeneous blend. When the aggregate is separately treated with the monoamine salt, the latter may be mixed with the aggregate as such, or the polyamine salt may be dissolved in a solvent, for example, kerosene, before being mixed with the aggregate. It is also possible to mix the aggregate, the monoamine salt and the bituminous substance simultaneously.

In any case, the monoamine salt need be used in only small amounts. Amounts ranging from about 0.05 to about 10 per cent by weight, preferably 0.1 to 2 per cent, of the bituminous substance when the monoamine salt is added to the bituminous substance have been found satisfactory; or about 0.001 per cent to about 1 per cent, preferably 0.01 to about 0.5 per cent, of the aggregate when the aggregate is treated separately with the monoamine salt.

The bituminous materials that may be employed in accordance with the invention are those employed in the construction and repair of roads, and are normally solid, semi-solid, or viscous liquids at ordinary atmospheric temperatures. Examples of suitable bituminous substances or bitumens are petroleum or native asphalt; pyrogenous distillates, such as oil-gas tar, coal tar; pyrogenous residues, such as blown asphalts, sludge asphalts, pressure tars, tar pitch; pyrobitumens, etc. In addition, mixtures of the foregoing materials, as well as mixtures or solutions of the aforesaid materials with solvents, such as naphtha, kerosene and stove oils, to give so-called liquid asphalts are also contemplated by the invention.

Of the foregoing materials, petroleum asphalt produced by steam-refining, by air-blowing, by solvent extraction methods, or by a combination of such methods, and having penetration values of about 30 to about 400 according to A. S. T. M. D-5-25 method, is most advantageously used. Also, but less desirably, oil-in-water type emulsions of these and other bituminous materials may be used. Such emulsions can be prepared by methods well known in the art, and the emulsions may be of the quick-breaking or penetration type or more stable type emulsions, such as slow-breaking or a mixing-type emulsion.

When the bituminous substance is present in the continuous phase, as in unemulsified asphalts, cut-backs and road oils, it is preferred to add the monamine salt to the bituminous substance. When the bituminous substance is emulsified in water, the monamine salt is preferably added to the aggregate.

The following examples illustrate the preparation of salts contemplated by the invention:

*Example I.—Preparation of monodecylamine-ethyl phosphate*

One part by weight of ethyl phosphoric acid was reacted at room temperature with ten parts by weight of monodecylamine to form a paste of monodecylamine-ethyl phosphate.

*Example II.—Preparation of di-n-butylamine-lauryl phosphate*

Nine parts by weight of lauryl phosphoric acid were reacted at room temperature with one part by weight of di-n-butylamine to form di-n-butylamine-lauryl phosphate.

*Example III.—Preparation of monoamylamine-cetyl phenyl thiophosphate*

Two parts by weight of cetyl phenyl thiophosphoric acid were reacted with one part by weight of monoamylamine to form monoamylamine-cetyl phenyl thiophosphate.

*Example IV.—Preparation of dimethylamine wood turpentine sulfate*

Two parts by weight of wood turpentine sulfate[1] were mixed with one part by weight of a 70% solution of dimethylamine in water to form a mixture of dimethylamine wood turpentine sulfate and water.

*Example V.—Preparation of asphalt sulfonic acid and monoamine salt of same*

(a) 500 grams of a 200 penetration (A. S. T. M. D-5-25 method) California steam-refined asphalt were dissolved in 1600 grams of carbon tetrachloride. To this solution was slowly added 85 grams of 95% sulfuric acid with continuous agitation and cooling. After this reaction mix had been left standing for 48 hours, the reaction mixture was shaken vigorously with 1500 grams of water. The water layer was then drawn off. The reaction mixture was shaken two more times with 1500 grams of water each time, followed by a like period of settling and the withdrawal of the water. At this point, the carbon tetrachloride may be evaporated from the sulfonated asphalt (asphalt sulfonic acid) in vacuo, using a minimum of heat, or the sulfonated asphalt may be used, as is, in the carbon tetrachloride solution.

(b) Two parts by weight of the above asphalt sulfonic acid were then reacted with one part by weight of a 70% water solution of diethanolamine at room temperature to form a viscous liquid of diethanolamine-asphalt-sulfonate and water.

[1] This wood turpentine sulfate is a partially purified by-product of the paper-manufacturing industry.

*Example VI.—Preparation of lignin sulfonic acid and monoamine salt of same*

(a) 500 grams of a purified lignin (as described by Plenguian, Ind. Eng. Chem. 32, 1399–1400 (1940) and United States Patent 2,228,976) were dispersed in 1600 grams of carbon tetrachloride. To this dispersion was slowly added 85 grams of 95% sulfuric acid with continuous agitation and cooling. After this reaction mix had been left standing for 48 hours, the reaction mixture was shaken vigorously with 1500 grams of water. The water layer was then drawn off. The reaction mixture was shaken two more times with 1500 grams of water each time, followed by a like period of settling and the withdrawal of the water. At this point, the carbon tetrachloride may be evaporated from the sulfonated lignin in vacuo, using a minimum of heat, or the sulfonated lignin may be used, as is, in the carbon tetrachloride solution.

(b) One part by weight of the lignin sulfonic acid so produced was reacted with ten parts by weight of dimethyl ethyl amine by stirring the two components together at room temperature to form methyl ethyl amine lignin sulfonate.

*Example VII.—Preparation of petroleum resin nitrate and monoamine salt of same*

(a) Three parts by weight of petroleum resin were treated with two parts by weight of fuming nitric acid (with constant agitation and cooling to keep the temperature at room temperature) to form the petroleum resin nitrate.

(b) One part by weight of the petroleum resin nitrate so prepared was treated with five parts by weight of di-n-butylamine by stirring the two components together at room temperature to form di-n-butylamine-nitrated petroleum resin salt.

The petroleum resin was obtained from a California steam-refined asphalt by the following procedure. The asphalt was treated with petroleum ether to precipitate the asphaltene fraction. The petroleum ether extract (which contained the petroleum resin fraction) was then treated with clay to separate the petroleum resin from other petroleum ether soluble fractions. The petroleum resin was extracted from the clay with a mixture of 1 part by volume of benzene and 1 part by volume of 190-proof ethanol. The benzene-ethanol solvent was then removed from the petroleum resin by distillation.

The following Table I illustrates the effectiveness of the monoamine salts of the invention on the retention of a film of asphalt on several types of aggregates. The film retention test used was a modification of the standard Nicholson film-stripping test described in the "Proceedings of Asphalt Paving Technologists," January 1932, page 43. In the test used, test samples of approximately 100 g. of the mixture of aggregate, bituminous substance and anti-stripping agent were allowed to cure in an oven at 140° F. for 24 hours. Following the curing period, about 50 g. of the cured mixture were placed in a flask partially filled with distilled water at 140° F. The flask was stoppered and placed in a frame which was rotated in a water bath at 140° F. After 15 minutes of rotation, the appearance of the mixture was reported in terms of estimated area that remained coated at the conclusion of the test. Conventionally, any aggregate retaining less than 70 per cent of film is considered to have failed.

Table I

| | Test Oil | Per Cent Film Retention on Aggregates | | |
|---|---|---|---|---|
| | | Limestone | Silica | Rhyolite |
| A | 100% Medium Curing (MC-2) Asphalt Cut-Back | 70 | 30 | 40 |
| B | 99% Medium Curing (MC-2) Asphalt Cut-Back plus 1% of the salt mixtures of Example I | 90 | 80 | 95 |
| C | 99% Medium Curing (MC-2) Asphalt Cut-Back plus 1% of the salt mixture of Example II | 100 | 100 | 100 |
| D | 99% Medium Curing (MC-2) Asphalt Cut-Back plus 1% of the salt mixture of Example III | 70 | 80 | 80 |
| E | 99% Medium Curing (MC-2) Asphalt Cut-Back plus 1% of the salt mixture of Example IV | 80 | 90 | 70 |
| F | 99% Medium Curing (MC-2) Asphalt Cut-Back plus 1% of the salt mixture of Example V | 90 | 60 | 70 |
| G | 99% Medium Curing (MC-2) Asphalt Cut-Back plus 1% of the salt mixture of Example VI | 90 | 80 | 70 |
| H | 99% Medium Curing (MC-2) Asphalt Cut-Back plus 1% of the salt mixture of Example VII | 80 | 80 | 70 |

The following examples further illustrate the practice of the invention:

Example VIII

Approximately 716 g. of glyceryl monostearate was heated with about 61.8 g. of boric acid to form a strongly acidic complex of the two substances. About 0.67 g. of the boric acid-monoglyceryl monostearate complex was added to about 99 g. of an MC-2 liquid asphalt at about 250° F. To this mixture there was added about 0.33 g. of isopropyl amine while stirring vigorously. Stripping results employing the modified Nicholson test hereinabove described were as follows:

| Limestone | Silica | Rhyolite |
|---|---|---|
| Percent 80 | Percent 80 | Percent 85 |

Example IX

Approximately 60 g. of starch and 31 g. of boric acid were stirred together with gentle heating until the mass fused into a boric acid-starch complex. About 0.33 g. of this complex was mixed with about 0.77 g. of tertiary butylamine, and the resulting mixture was added to 99 g. of an MC-2 liquid asphalt. Film-stripping results obtained from the modified Nicholson test hereinabove described were as follows:

| Limestone | Silica | Rhyolite |
|---|---|---|
| Percent 70 | Percent 80 | Percent 90 |

Example X (a) A stock of crude eocene phosphonic acids was prepared according to the process described in the Jensen and Clayton copending application, filed December 13, 1946, Serial No. 716,182. That is, about 144 pounds of eocene (a petroleum fraction of aniline point 161.6 and a boiling range of about 325-500° F.) were mixed with phosphorus trichloride. Dry oxygen was bubbled through the mixture until the temperature of the reaction mixture started to drop. A major portion of the $POCl_3$ formed as a by-product of the reaction was distilled off under vacuum, and then 100 pounds of cracked ice added to hydrolyze the product. After thorough agitation, the water layer was drawn off, the reaction mixture washed twice with water, and the resultant crude phosphonic acid stock used as an anti-stripping ingredient. The active acid content was determined to be about 20 per cent of the reaction product.

(b) About 0.87 g. of the eocene phosphonic acid and 0.13 g. of n-hexylamine was added to 99 g. of liquid asphalt. Anti-stripping results of the so-treated liquid asphalt were as follows:

| Limestone | Silica | Rhyolite |
|---|---|---|
| Percent 100 | Percent 90 | Percent 80 |

The following Table II illustrates further the effectiveness of the monoamine salts of organo-substituted inorganic acids herein described. The additive, formed by combining the salt-forming elements listed below in the indicated proportions by weight, was added to MC-2 road oil. After incorporation of the additive in the road oil, the mixture was heated to 250° F., following which the treated road oil was applied to the different types of aggregates indicated in the table below. Per cent film retention was determined according to the Nicholson test hereinabove mentioned.

Table II

| Additive | Percent Film Retention | | | |
|---|---|---|---|---|
| | Limestone | Silica | Rhyolite | Average |
| 1% {1 part cetyl phosphoric acid / 0.5 part dimethylamine} | 90 | 80 | 90 | 85 |
| 1% {1 part cetyl phosphoric acid / 0.2 part monoamylamine} | 90 | 80 | 100 | 90 |
| 1% {1 part cetyl phosphoric acid / 0.5 part mixed amylamines} | 100 | 100 | 100 | 100 |
| 0.5% {1 part cetyl phosphoric acid / 1 part di-n-butyl-amine} | 90 | 80 | 90 | 90 |

We are aware of the fact that compounds of a nature somewhat similar to that of our compounds have been proposed as anti-stripping agents. For example, Dohse et al. Patent No. 2,191,295 discloses as anti-stripping agents the salts of polyethylene amines, and certain derivatives thereof, formed with hydrochloric, sulfuric, tartaric, acetic, citric or phosphoric acids. Our salt materials, however, containing an organic substituent in the acid portion of the molecule, have been found to give unexpectedly superior results.

These results are illustrated by the test data hereinbelow appearing in Table III, which data were obtained from a comparison of monoamine salts of unsubstituted acids, as disclosed by the aforesaid patent, with the monoamine salts of the organo-substituted inorganic acids of the present invention. Per cent film retention was determined according to the modified Nicholson film-stripping test hereinabove described.

Table III

| Test No. | Percent Additive, MC-2 Road Oil | Percent Film Retention |||
|---|---|---|---|---|
| | | Limestone | Silica | Rhyolite |
| 1 | 0% Blank | 60 | 30 | 20 |
| 2 | 1% {1 part HCl / 1 part mixture of amylamines} | 60 | 95 | 10 |
| 3 | 1% {1 part $H_2SO_4$ / 1 part mixture of amylamines} | 70 | 50 | 5 |
| 4 | 1% {1 part $H_3PO_4$ / 1 part mixture of amylamines} | 60 | 60 | 20 |
| 5 | 1% {1 part cetyl phosphoric acid / 1 part mixture of amylamines} | 100 | 100 | 100 |

From the foregoing data it will be noted that as regards the easily coated limestone, the unsubstituted phosphoric acid was only 60 per cent effective, whereas the substituted phosphoric acid was 100 per cent effective. With silica aggregate, the unsubstituted phosphoric acid was only 60 per cent effective, while our substituted phosphoric acid was 100 per cent effective. When the tests were conducted with Rhyolite, an aggregate normally quite difficult to coat securely, the combination of unsubstituted phosphoric acid and the mixture of amylamines of test 4 was only 20 per cent effective, whereas, as shown in test 5, when using the organo-substituted inorganic acid the coating was 100 per cent effective. A similar improvement is shown in the use of organo-substituted phosphoric acid over the unsubstituted hydrochloric and sulfuric acids.

The salts herein contemplated need not be added to the bitumen and/or to the aggregate in pure form. For example, in the event a diluent, for example, kerosene, for any or both of the salt-forming reactants is employed, upon formation of the salt the diluent need not be removed from the reaction product prior to its use with the bitumen, sufficient amount of the diluted salt being used as to give the calculated desired amount of salt in the finished product.

Conversely, it is often advantageous to prepare the salts in concentrate form, which concentrate may then be incorporated into either bitumen or aggregate or both in the desired amounts. Such a procedure has the advantage of providing for more intimate admixture of the salt and the material to be treated. Concentrates of hydrocarbon oil, such as kerosene or naphtha, containing from about 15 per cent to as much as 50 per cent by weight of the salt are quite satisfactory. In addition to kerosene, other hydrocarbon diluents or solvents may be employed in the preparation of the concentrate. Such materials include mineral oils, lubricating oils and the like. Examples of other diluents are bituminous substances such as the so-called liquid asphalts hereinabove mentioned.

Obviously, many modifications and variations of the invention, as hereinabove set forth, may be made without departing from the spirit and scope thereof, and only such limitations are to be imposed as are indicated in the appended claims.

We claim:

1. A bituminous composition having superior anti-stripping properties consisting essentially of a bitumen normally possessing stripping tendencies and an amount sufficient substantially to lessen stripping of said bitumen of the salt of an organo-substituted inorganic acid having at least two carbon atoms and at least one ionizable hydrogen, and a water soluble, substantially surface inactive monoamine characterized by an acyclic carbon-to-nitrogen bond, said salt containing at least twelve carbon atoms in the molecule.

2. A bituminous composition substantially as described in claim 1, wherein the acid contains at least six carbon atoms.

3. A bituminous composition substantially as described in claim 1, wherein the acid contains at least ten carbon atoms.

4. A bituminous composition substantially as described in claim 1, wherein the bitumen is asphalt.

5. A bituminous composition substantially as described in claim 1, wherein the salt is present in an amount of about 0.05 to 10% by weight of the bitumen.

6. A bituminous composition substantialy as described in claim 1, wherein the salt is present in an amount of about 0.1 to about 2% by weight of the bitumen.

7. A bituminous composition substantially as described in claim 1, wherein the organo-substituted inorganic acid is characterized by a direct carbon-to-acid-forming-element bond.

8. A bituminous composition substantially as described in claim 7, wherein the acid has at least six carbon atoms.

9. A bituminous composition substantially as described in claim 7, wherein the acid contains at least ten carbon atoms.

10. A bituminous composition having superior anti-stripping properties consisting essentially of a bitumen normally possessing stripping tendencies and an amount sufficient substantially to lessen stripping of said bitumen of the salt of a water soluble, substantially surface inactive monoamine characterized by an acyclic carbon-to-nitrogen bond, and an organo-substituted inorganic acid having at least two carbon atoms and at least one ionizable hydrogen, said carbon atoms being linked to the acid-forming element of said acid through an intermediate atom, and said salt having at least twelve carbon atoms in the molecule.

11. A bituminous composition substantially as described in claim 10, wherein the acid has at least six carbon atoms.

12. A bituminous composition substantially as described in claim 10, wherein the acid has at least ten carbon atoms.

13. A bituminous composition substantially as described in claim 10, wherein the intermediate carbon atom is oxygen.

14. A bituminous road construction composition consisting essentially of, in intimate combination, a mineral aggregate, a bituminous substance and about 0.05 to 10% by weight of the bituminous substance of the salt of an organo-substituted inorganic acid having at least two carbon atoms and at least one ionizable hydrogen, and a water soluble, substantially surface inactive monoamine characterized by an acyclic carbon-to-nitrogen bond, said salt containing at least twelve carbon atoms in the molecule.

15. A bituminous road construction composition substantialy as described in claim 14, wherein the salt is present in an amount of about 0.1 to about 2% by weight of the bituminous substance.

16. A bituminous road construction composition substantially as described in claim 14, wherein the bituminous substance is asphalt and the organo-substituted inorganic acid has at least six carbon atoms.

VAUGHN R. SMITH.
DON E. STEVENS.
EDWARD W. MERTENS.

REFERENCES CITED

The following references are of record in the file of this patent:

UNITED STATES PATENTS

| Number | Name | Date |
| --- | --- | --- |
| 2,191,295 | Doshe et al. | Feb. 20, 1940 |
| 2,236,515 | Cahn et al. | Apr. 1, 1941 |
| 2,318,296 | Dickey et al. | May 4, 1943 |
| 2,370,386 | Anderson et al. | Feb. 27, 1945 |
| 2,378,235 | Miles | June 12, 1945 |
| 2,387,235 | Smith et al. | Oct. 23, 1945 |
| 2,447,288 | Smith et al. | Aug. 17, 1948 |